United States Patent [19]

Barbieri

[11] 4,415,006

[45] Nov. 15, 1983

[54] MARKER SLEEVES

[75] Inventor: Joseph C. Barbieri, Cedarburg, Wis.

[73] Assignee: W. H. Brady Co., Milwaukee, Wis.

[21] Appl. No.: 972,934

[22] Filed: Dec. 26, 1978

[51] Int. Cl.[3] .............................................. F16L 11/12

[52] U.S. Cl. .................................................... 138/115

[58] Field of Search ........................ 138/115, 119, 104; 40/316, 23 R, 23 A; 174/112

[56] References Cited

U.S. PATENT DOCUMENTS 3,487,574 1/1970 Lööf .................................... 138/119

3,534,777 10/1970 Loof .................................... 138/104

FOREIGN PATENT DOCUMENTS 2614700 10/1976 Fed. Rep. of Germany ........ 40/316

2254256 7/1975 France ................................. 40/316

*Primary Examiner*—Lenard A. Footland

*Attorney, Agent, or Firm*—Quarles & Brady

[57] ABSTRACT

A marker sleeve (1, 1A, 15, 20, 30, 40, 50 or 60) having an outer wall (2) defining a tubular body and at least one inner web (3, 4, 16, 21–23, 31–34, 42, 52 or 62) extending longitudinally of the tubular body. An inner web is spaced from its overlying outer wall portion along a longitudinally extending aperture (5, 18, 25, 35, 41, 51 or 61). The marker sleeve is to be positioned about an article which extends through its tubular body.

6 Claims, 13 Drawing Figures

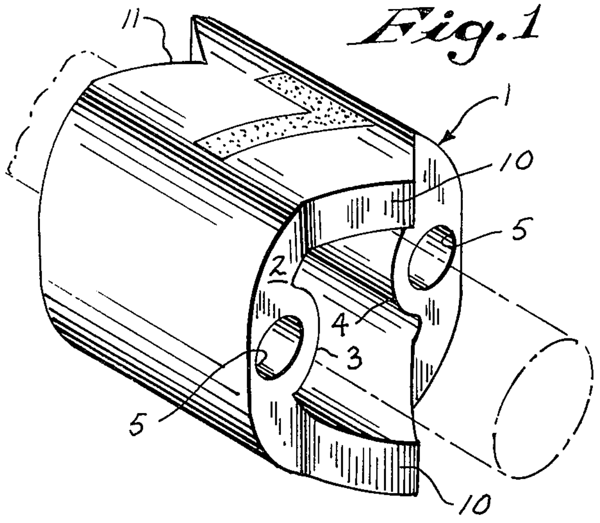
Fig.1
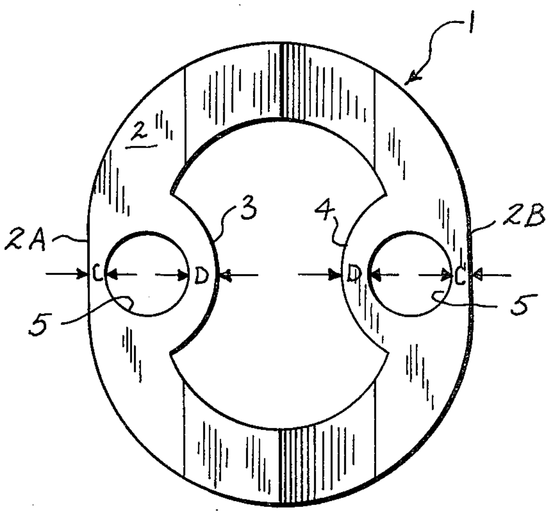
Fig.2
Fig.3
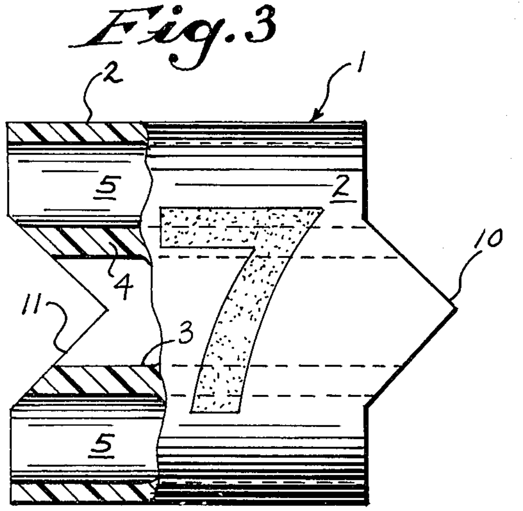
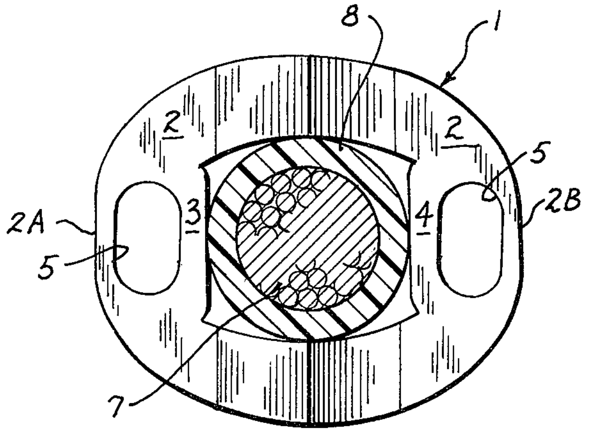
Fig.4
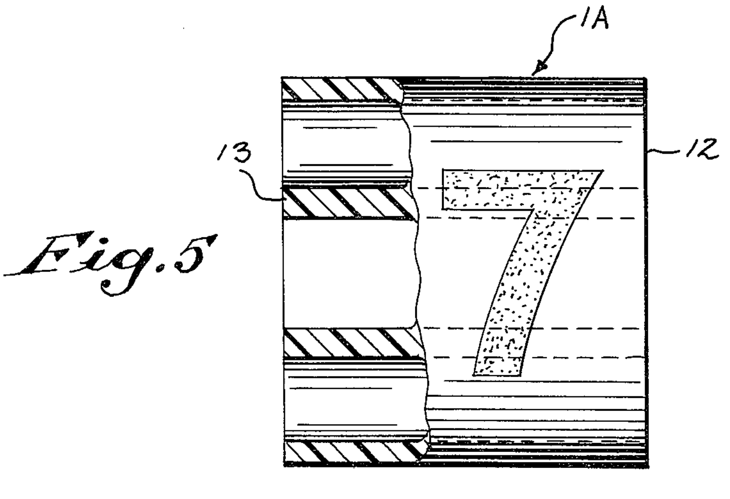
Fig.5

MARKER SLEEVES

TECHNICAL FIELD

This invention relates to the art of marker sleeves which comprise a tubular or ring-like member adapted to be positioned upon and encircle an object. A marker sleeve of this type often carries alpha-numeric indicia or is color coded to enable identification of the article to which it is applied.

BACKGROUND ART

Marker sleeves have been known to the art for many years which comprise tubular bodies having a circular cross section and a smooth outer wall, the sleeves generally being made of a slightly elastic extruded thermoplastic material. The sleeves are especially useful for application to electrical wires for identification purposes. A marker of this type in a given size, however, generally is limited to use with a narrow size range of articles because it is often difficult to stretch it sufficiently to fit about larger diameter objects, and it can only loosely fit smaller diameter articles instead of being firmly positioned in place.

Various sleeve constructions have been developed to overcome some of the problems of the circular sleeve marker. One of these shown in the patent art, but of unknown commercial acceptance, is a sleeve having internal logitudinal V-shaped grooves, see Italian patent No. 625,732. Other forms, which have presently gained wider commercial usage, have one or more longitudinally extending convolutions or loops which are intended to allow the sleeve to be expandable, see U.S. Pat. Nos. 3,487,574 and 3,534,777. A prior art marker sleeve similar to the former patent is shown in cross section FIG. 6 and has a longitudinal groove which may be described as an inverted V-shape. Another prior art sleeve of this general type, which is also used commercially, is shown in FIG. 7 and has an upright V-shaped groove extending longitudinally of the sleeve.

DISCLOSURE OF THE INVENTION

My present invention relates to a marker sleeve of a new construction, which utilizes a novel interior wall structure that provides effective engagement with the article to be marked and which can accommodate a useful range of sizes with a particular size of sleeve or a small number of sleeves of varying sizes. The new marker sleeve has an outer wall defining a tubular body which may have a circular or oval cross section; the outer wall has a smooth exterior surface, thereby eliminating the V-shaped groove of some of the prior art sleeves. Further, the sleeve has at least one inner web that is separated from an overlying part of the outer wall of the marker by a longitudinally extending aperture. Each inner web extends radially inwardly so that the marker sleeve has a non-circular internal construction. Each inner web contacts or engages the article which is to be marked. Thus, the new marker sleeve is held in place on most sizes of objects by deformation or straightening of an inner web which causes its adjacent outer wall portion opposite a longitudinal aperture to stretch, and this coaction enables the marker sleeve to be snugly positioned on an object.

BRIEF DESCRIPTION OF DRAWINGS

In the drawings:

FIG. 1 is a perspective view of a marker sleeve according to the present invention;

FIG. 2 is a cross-sectional view of the marker sleeve shown in FIG. 1;

FIG. 3 is a plan view of the marker sleeve of FIG. 1;

FIG. 4 is a cross-sectional view showing the marker sleeve of FIG. 1 positioned on an object;

FIG. 5 is a side view of a marker sleeve of the present invention showing a different end wall construction than that of FIG. 1-4;

BEST MODES FOR CARRYING OUT THE INVENTION

Figure 6:
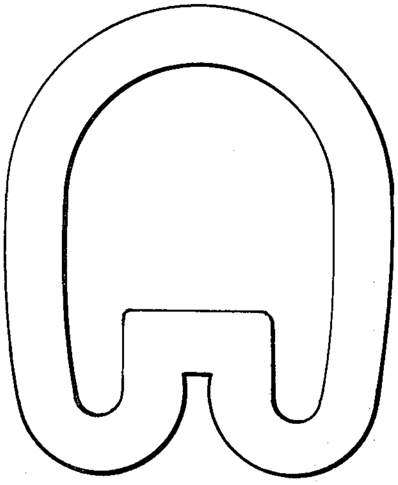
PRIOR ART Fig. 6
FIG. 6 is a cross-sectional view of a marker sleeve of the prior art.

Several embodiments of the marker sleeves of the present invention are illustrated in FIGS. 1-5 and 8-13.

FIGS. 1-4 illustrate a marker sleeve 1 having an outer wall 2 which defines a generally tubular body having essentially a smooth outer surface. The marker sleeve 1 may be of any desired length and diameter depending upon its specific end-use; sizes in the range of 0.1" to 1" in length, or about 2.5 to 25 mm. long and from about ⅛" to 1" or 3 to 25 mm. in diameter are generally used. As illustrated in the cross-sectional view of FIG. 2, the marker 1 may have an oval cross-section, although it may also have a circular cross-section if desired. Inner webs 3 and 4, having an arcuate cross-section are joined at each of their ends to the inner surface of the outer wall and extend inwardly of the interior of the tubular marker 1, i.e. the inner webs are directed radially inwardly of the cross-section of the body of the sleeve. In the form illustrated in these figures, the inner webs 3 and 4 are positioned diametrically opposite from one another, and each occupies a minor portion of the internal periphery of the marker sleeve. Inner web 3 is separated from its overlying portion 2A of the outer wall of the marker along a longitudinally extending opening 5, and inner web 4 is separated from its overlying portion 2B of the outer wall along a similar opening 5. The inner webs extend longitudinally or axially of the marker sleeve as best depicted in FIG. 3. With a pair of the inner webs 3 and 4, the internal cross-section of the marker 1 has a generally hour-glass configuration.

In a particularly effective structure, although not mandatory with the present invention, the web thickness of the overlying outer wall portions 2A and 2B as measured in the longitudinal plane extending through the axis of the sleeve and through the centers of the apertures 5, shown by the reference letter C in FIG. 2 is somewhat less than the web thickness of the inner webs 3 and 4 as denoted by the reference letter D in FIG. 2, for the purpose described herein below.

FIG. 4 illustrates the marker sleeve 1 positioned about a wire 7 having an external insulation layer 8. It will be noted that the inner webs 3 and 4 have each engaged the wire and assumed a straightened condition upon contact with the wire, and that their overlying wall portions 2A and 2B respectively have become slightly stretched. This condition is further indicated by the elongation of the longitudinal apertures 5. This combined straightening of the inner webs and stretching of the respective overlying outer wall portions enables the marker 1 to snugly grip the wire 7 and to be held in place in the desired position. It has been noted the marker sleeves 1 as described are able to accomodate a range of various sizes of wires (or similar objects). Thus, with a wire of a relatively smaller diameter than that illustrated in FIG. 4, the inner webs 3 and 4 will form the principal engagement with the wire; with a medium-sized wire as shown in FIG. 4, the outer wall portions 2A and 2B, which are thinner than the inner webs 3 and 4, stretch when the inner webs deform or straighten and thereby provide for a gripping or locking engagement with the wire; and with a relatively larger diameter than that shown in FIG. 4, both the inner webs 3 and 4 and outer wall portions 2A and 2B each stretch somewhat to firmly hold the market in place.

As shown in FIGS. 1 and 3, the marker sleeve 1 will normally carry some type of identification indicia such as the numeral 7 shown in these figures. Any desired information may be carried on the marker, such as a name, trademark, numerical sequence, combination of letters and numbers, etc. Also, if no specific information is required, the sleeves may be made of a material which is color coded in order to provide for identification. It is also possible that in some instances a marker sleeve would be used to provide insulating material at a particular location on an electrical wire or to cover a contact element.

As best shown in FIGS. 1 and 3, one end wall of the sleeve 1 may be provided with tongues 10 extending from the main body of the marker, and the opposite end wall of the marker may be provided with similarly shaped grooves 11. When two or more markers are applied about an object, the tongues 10 of one marker may extend into the grooves 11 of an adjacent marker so that the two markers can be appropriately aligned with one another if so desired. Other end wall constructions may be employed with the present marker sleeves, however, such as that shown in FIG. 5 with respect to marker sleeve 1A which has flat end walls 12 and 13, i.e. walls which extend perpendicularly to the longitudinal axis of the sleeve.

Figure 8:
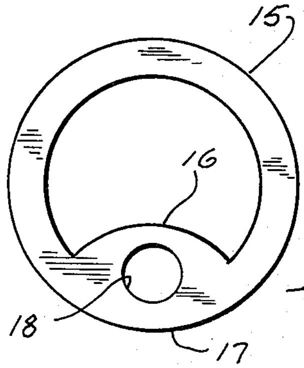
FIGS. 8-13 are cross-sectional views of marker sleeves according to the present invention having different internal configurations than the marker sleeves of FIGS. 1-5.
Figure 11:
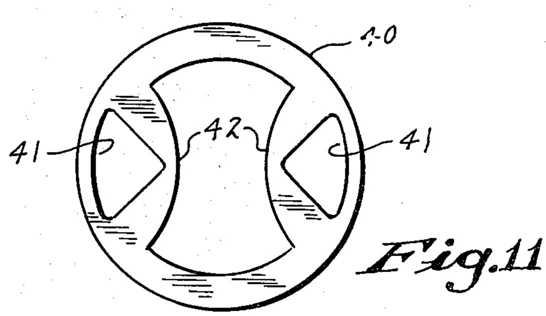
Figure 9:
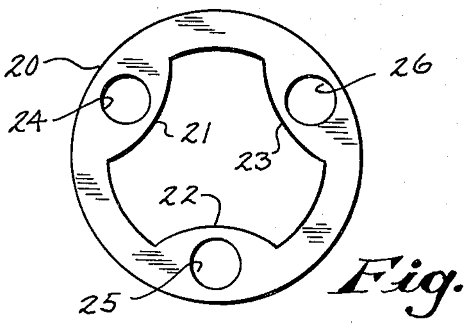
Figure 12:
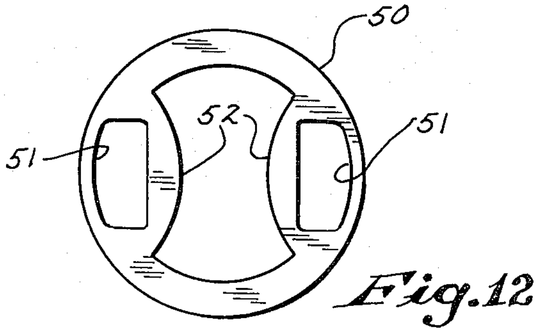
Figure 10:
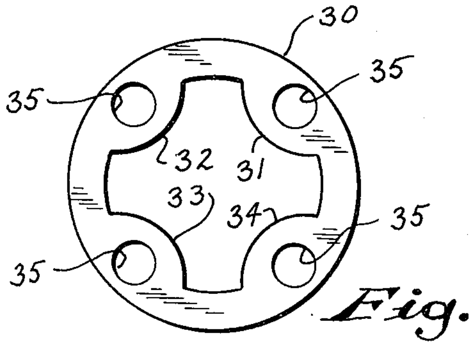
Figure 13:
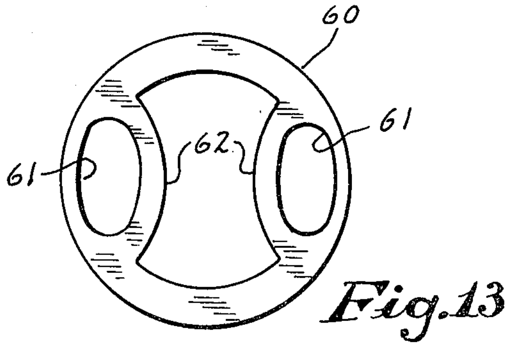

Marker sleeves according to the present invention may be made with one or more inwardly projecting inner webs. In FIG. 8 a marker sleeve 15 is shown which has one inner web 16 separated from an overlying portion 17 of the outer wall along a single longitudinally extending aperture 18. in FIG. 9, a marker sleeve 20 has 3 inner webs 21, 22 and 23 each separated from an overlying portion of the outer wall of the sleeve along longitudinally extending apertures 24, 25 and 26. In FIG. 10, marker sleeve 30 has four inner webs 31–34 each separated from an adjacent overlying portion of the outer wall along longitudinally extending apertures 35.

In addition to the circular longitudinal apertures shown in FIGS. 1–5 and 8–10, other configurations for the apertures may be employed. Thus in FIG. 11, marker sleeve 40 has triangular longitudinal openings 41 which separate inner webs 42 from their respective overlying portions of the outer wall. Marker sleeve 50 of FIG. 12 has generally rectangular openings 51 between its inner webs 52 and their adjacent overlying outer wall portions, and in FIG. 13 marker sleeve 60 has oval shaped longitudinal openings 61 between the inner webs 62 and their overlying adjacent outer wall portions.

The marker sleeves of the present invention can be made with any thermoplastic material which can be extruded to achieve the proper cross sectional configuration, and most usefully of a material having at least a slight degree of elasticity so that the marker sleeves can expand slightly for insertion about articles of various size ranges. Typical useful materials include polyvinyl chloride homopolymers and copolymers, nylon, ABS materials, polyolefins such as polyethylene and polypropylene or copolymers, and fluorocarbons such as polytetrafluorethylene. Elastomeric material such as natural and synthetic rubbers are also suitable, particularly those which are appropriately compounded to achieve the desired rigidity and slight elasticity. Polyvinyl chloride materials are generally the most used for this type of product. Other criteria which may be used to select an appropriate material for a specific marker are whether it is necessary to be resistant to moisture, solvents or other chemicals, and whether it is to be an insulating material if used for application to electrical articles such as electrical conductors and other objects.

Alpha-numeric indicia, when used in connection with the marker sleeves, may be applied by printing, hot stamping or embossment, whichever is most appropriate for the specific end use of the marker sleeve and best suited to the specific material of which it is made. Also, the materials from which the sleeves are made should be capable of being colored, as by blending in suitable coloring agents, if a color coded identification function is desired.

The marker sleeve described above provides a combination of several advantages not found with prior art sleeves. The new marker sleeve has an internal construction which results in secure engagement about an article to which it is applied. When an article is inserted through the tubular body of the sleeve, the inner webs that are positioned along the interior and extend radially inwardly of the sleeve are forced to a straightened or upright condition relative to their initial position; this movement of an inner web causes an overlying outer wall portion to stretch. It will further be noted that when the marker sleeve is formed with an oval cross-section (FIG. 2) the major axis of the oval is shifted 90° when an article is inserted through the sleeve (FIG. 4). This rearrangement of the sleeve cross-section also is brought about by the action of the inner webs upon the outer wall portions when the sleeve is applied to an object. What is believed to take place is that as a wire or similar object displaces the inner webs along the interior of the sleeve and the inner webs force the outer wall portions into a straightened or stretched position, the force of the wire against an inner web is equalled by an equal and opposite force set up in an inner web as it resists the straightening action. There is no prior art marker sleeve to date that exhibits this type of engagement with an object, and the present marker sleeve is believed to engage an article in a more firm and secure manner than is attainable by the prior art sleeves. Also, a substantial portion of the inner structure of the present marker sleeve engages an article, which further aids in retaining the sleeve in a desired position, unlike some prior art sleeves which have only minimal contact with an article.

Another advantage of the present marker sleeve is that it maintains a close profile with the object to which it is applied. It has a smooth external configuration which will minimize interference with surrounding objects. The desired gripping engagement is achieved by the internal construction of the marker sleeve, so that the external outer wall can have a minimal diameter. This can be particularly helpful, for example, in installations in which a number of wires located in the same general area are closely spaced together and each must be individually identified.

Figure 7:
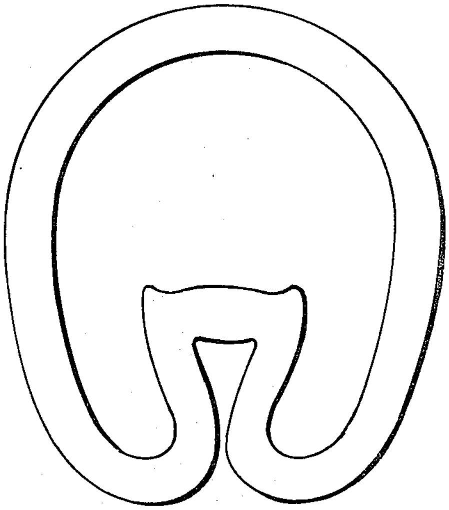
PRIOR ART Fig. 7
FIG. 7 is a cross-sectional view of a marker sleeve of the prior art.

Another advantage is that, as indicated in the drawings, the outer wall of the marker sleeve of the present invention may be made with a substantially smooth exterior surface. This feature enables the application of alphanumeric identification information about the entire outer periphery of the marker sleeve if desired for a particular installation. This differs from the prior art sleeves of FIGS. 6 and 7 in which a substantial portion of the exterior peripheral surface of the marker is disrupted by folds or convolutions extending along one side of the sleeve so that only part of the surface is available for identification purposes.

These and other advantages are obtained with a marker sleeve construction which can be readily manufactured by extrusion techniques using an appropriate die, has an attractive appearance, and provides effective and highly visible identification of an article.

I claim:

1. In a marker sleeve of slightly elastic material of the type comprising an outer wall defining a tubular body which is to be positioned about an article and a plurality of inner webs each secured at its ends to the outer wall and extending longitudinally along the interior of the tubular body for engagement with an article to which the marker sleeve is applied, the improvement wherein:

(a) the plurality of inner webs are equally spaced from one another about the interior of the tubular body, (b) each inner web is separated from its respective overlying portion of the outer wall by a longitudinally extending aperture of circular, oval, rectangular or triangular cross section, and (c)the inner webs have an initial position wherein they extend radially inwardly of the tubular body and a second position assumed upon engagement with an article in which they straighten relative to their initial position and stretch their respective overlying portion of the outer wall to provide for firm engagement of the sleeve with an article to which it is applied.

2. A marker sleeve according to claim 1 wherein:

the tubular body is of oval cross section having a major axis, and movement of the inner webs from their initial position to their second position causes the major axis of the tubular body to shift.

3. A marker sleeve according to claim 1 including:

a pair of inner webs, each extending inwardly along the interior of the marker sleeve for engagement with an article.

4. A marker sleeve according to claim 1 including:

three inner webs, each extending inwardly along the interior of the marker sleeve for engagement with an article.

5. A marker sleeve according to claim 1 including:

four inner webs, each extending inwardly along the interior of the marker sleeve for engagement with an article.

6. A marker sleeve according to claim 1, 2, 3, 4 or 5 wherein:

the thickness of each inner web is greater than the thickness of its respective overlying portion of the outer wall, both measured in the plane including an axis of the marker sleeve and the center of an aperture between an inner web and its overlying outer wall portion.

* * * * *